United States Patent [19]

Broughton

[11] Patent Number: 4,834,887

[45] Date of Patent: May 30, 1989

[54] IN-LINE COAXIAL CENTRIFUGAL SEPARATOR WITH HELICAL VANE

[76] Inventor: Amos W. Broughton, 505W, Temple City, Calif. 91780

[21] Appl. No.: 166,462

[22] Filed: Mar. 10, 1988

[51] Int. Cl.$^4$ ............................................. B01D 21/26
[52] U.S. Cl. .................... 210/512.1; 209/211
[58] Field of Search ............................. 210/512.1, 521; 209/144, 211; 494/901; 55/394, 397

[56] References Cited

U.S. PATENT DOCUMENTS

| | | | |
|---|---|---|---|
| 2,512,253 | 6/1950 | Lipscomb | 209/211 |
| 2,591,396 | 4/1952 | Bergner | 209/144 |
| 3,399,770 | 9/1968 | Salomon | 210/512.1 |
| 3,956,131 | 5/1976 | Harvey | 210/202 |
| 4,376,676 | 3/1983 | Gill | 55/206 |
| 4,678,588 | 7/1987 | Shortt | 210/512.1 |

Primary Examiner—Richard V. Fisher
Assistant Examiner—Cynthia L. Nessler
Attorney, Agent, or Firm—J. L. Jones, Sr.

[57] ABSTRACT

A coaxial centrifugal separator device has a linear pipe fixed diameter exterior, with a coaxial pipe entrance with multiple internal helical spiraling vanes disposed and secured to the interior wall of the pipe length, the interior helical spiraling vanes providing a centrifugal motion to the fluid multi-phase input flow into the centrifugal device. The centrifugal motion imparted to the multi-phase input fluid finally separates the total input fluid into flowing concentric streams in the device, the fluid stream having the lowest density being centered along the centrifugal device pipe centerline. The highest density particulates stream is disposed along the interior wall of the centrifugal device in a generally laminar flow. Thus, in an application to a three phase fluid stream pumped into the centrifugal separator device, the coaxial centrifugal separator device produces a central axially disposed lower density stream which can be removed from the downstream output by a centrally coaxially disposed probe tube in the device, and which exits to a low density phase tank collector. The denser-than water solid phase which forms as a laminar exterior phase of the multi-phase fluid is collected in an exteriorily disposed in-line collar of the centrifugal device disposed coplanarly with the probe tube collecting the centrally disposed phase.

6 Claims, 1 Drawing Sheet

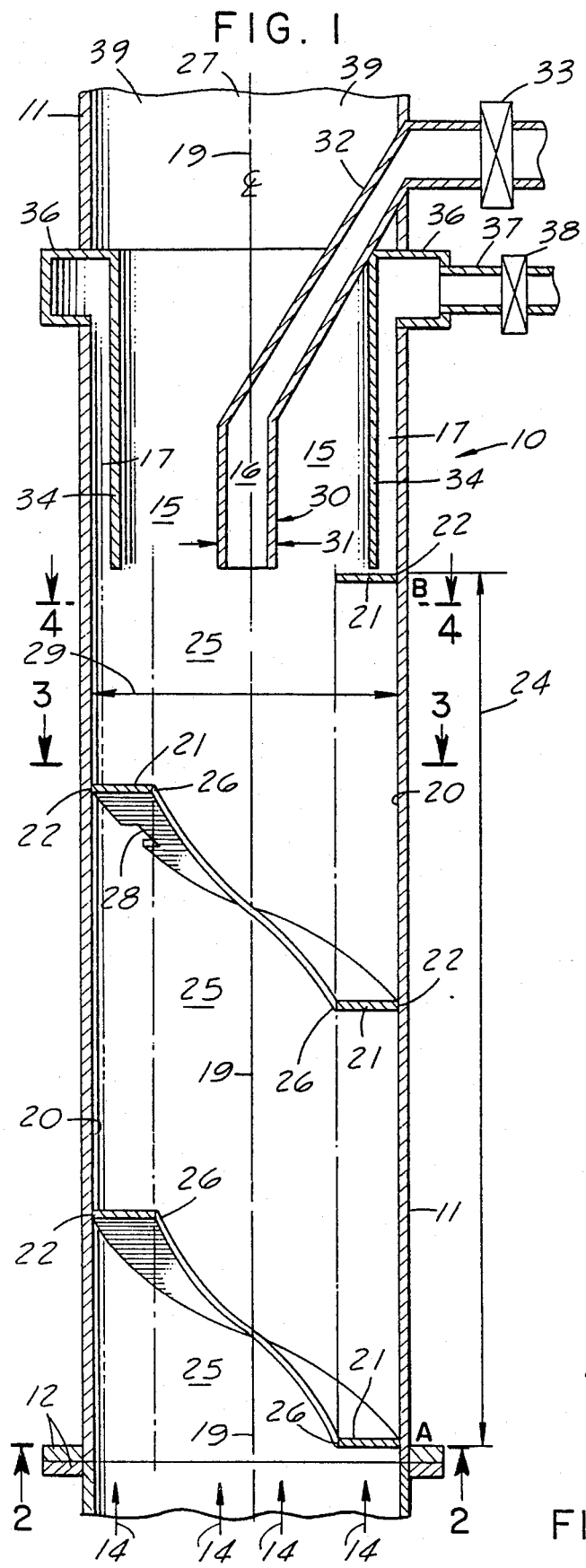
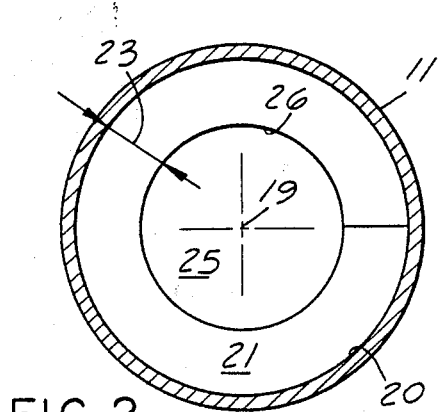
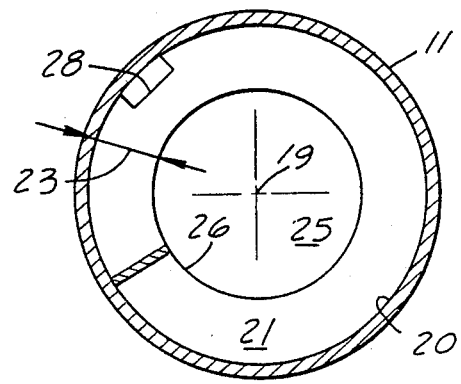
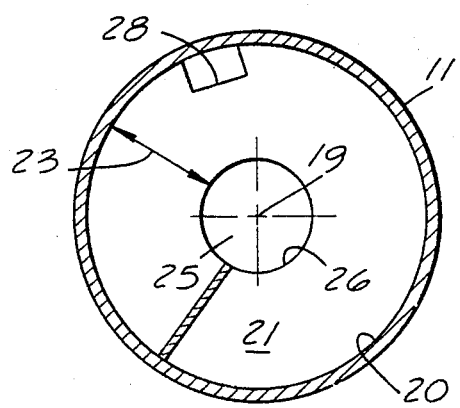
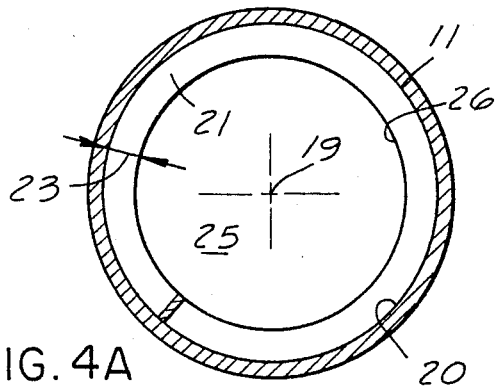

IN-LINE COAXIAL CENTRIFUGAL SEPARATOR WITH HELICAL VANE

BACKGROUND OF THE INVENTION

The coaxial separator device of this invention is classified in Classes 494/29,901; 233/10; 3, 2, 19A, 18 and 210.

Erickson, in U.S. Pat. No. 4,036,427 issued July 19, 1977, teaches and discloses a combination of a pitot pump and centrifugal separator for pumping contaminated fluids and for separating contaminants from the pumped fluid. It includes a rotatable hollow casing. Contaminated fluid is delivered to the interior of the casing and a pumped fluid discharge is provided coaxially from the casing.

Kartinen, in U.S. Pat. No. 4,010,891, issued Mar. 8, 1977, teaches and discloses an apparatus for permitting a direct flow of vapor entrained in incoming oil/water streams to a centrifugal oil/water separator device into the oil collection chamber of such a device to inhibit the accumulation of such vapor within the input impeller chamber of such a centrifugal separator and to thereby assure proper operation of said impeller and the prohibition of cavitation within the separator.

De Martini, in U.S. Pat. No. 3,599,861 issued Aug. 17, 1971, teaches and discloses a centrifuge for separating mixtures consisting of solids and at least one liquid, comprising a rotatable drum formed by two opposed hollow cones, in one of which a hollow worm is coaxial and rotatable relative to the drum.

Kartinen, in U.S. Pat. No. 3,791,575 issued Feb. 12, 1974 teaches and discloses a discharge control system for a centrifugal separator.

In U.S. Pat. No. 3,342,408 issued Sept. 19, 1967, Bergstrom teaches and discloses a centrifugal separation system for mixtures of materials having different densities. Centrifugal separation may be used to separate components in purified form.

In U.S. Pat. No. 2,234,921 issued Mar. 11, 1941, Webb teaches and discloses an apparatus for the countercurrent treatment of two immiscible fluids over a large area of counter flow between a pair of immiscible liquids, or a liquid and a vapor.

In U.S. Pat. No. 1,917,792 issued July 11, 1933, Bowen teaches and discloses a method and apparatus for separating fluids. The fluids can be liquid, gases, and finely divided solids carried by liquids and gases. The apparatus is a centrifugal separator that is rapid and continuous in operation. A rotating tubular body receives the fluid, means for trapping and drawing off the solid matter is provided, and means for trapping and draining off the oil is also provided.

In U.S. Pat. No. 1,710,316 issued Apr. 23, 1929, Laughlin teaches and discloses a centrifugal machine. The machine is a constantly driven rotary separator for acting on input materials continuously. The material input can have solid particles and a plurality of liquids of relatively different specific gravities. A powered rotating shaft separates oil from water, and the solid particles are also separated.

Palmer, in U.S. Pat. No. 1,696,859 issued Dec. 25, 1928 teaches and discloses an apparatus for dehydrating crude oils. Crude oil input is sprayed into a rotating cylinder and the water and other solids are sprayed to the outer periphery of the rotating cylinder and removed by collector pipes and valves.

In a series of twelve U.S. Patents granted from 1966 to December 1981, Claude C. Laval has taught and described separating devices from U.S. Pat. No. 3,289,608 of December 1966 for removing sand from water and the like in deep wells at deep depths.

Laval, U.S. Pat. No. 4,305,825 issued December 1981 further teaches and discloses a separating device wherein a fluid enters tangentially in a rotating chamber downwardly/and then separately.

The C. C. Laval, Jr. patents are listed as follows:
U.S. Pat. No. 4,305,825—issued Dec. 15, 1981
U.S. Pat. No. 4,148,735—issued Apr. 10, 1979
U.S. Pat. No. 4,140,638—issued Feb. 20, 1979
U.S. Pat. No. 4,147,630—issued Apr. 3, 1979
U.S. Pat. No. 4,120,795—issued Oct. 17, 1978
U.S. Pat. No. 4,072,481—issued Feb. 17, 1978
U.S. Pat. No. 3,963,073—issued June 15, 1976
U.S. Pat. No. 3,947,364—issued Mar. 30, 1976
U.S. Pat. No. 3,701,425—issued Oct. 31, 1972
U.S. Pat. No. 3,568,837—issued Mar. 9, 1971
U.S. Pat. No. 3,512,651—issued May 19, 1970
U.S. Pat. No. 3,289,608—issued Dec. 6, 1966

The prior art of C. C. Laval listed above does not offer art which can be considered an obvious relevant disclosure of this invention.

SUMMARY OF THE INVENTION

A solid particle gravitationally settling through a liquid is subjected to constantly increasing force as it travels away from the axis of rotation in a centrifuge. The particle settling velocity v is given by the Stokes Relation (1)

$$v = 2/9 \, (g \, r^2 d)/n \tag{1}$$

g—is the gravitational constant,
r—is the particle radius,
d—is the particle density,
n—is the viscosity of the fluid through which the particle is falling The well known Stokes relation (1) quantifies the settling velocity of a particle in a liquid, as the liquid is centrifuged.

In this invention, a coaxially disposed inlet pipe is fed by gravity feed, or a selected pump feed such as a gear pump, diaphragm pump, or a Moyno pump. The coaxial inlet pipe directly empties into a coaxial diameter tubular in-line uniform diameter pipe separation chamber. The separator chamber has multiple flights of continuously connected helical spiraling thin wall vanes disposed and adaptively spaced in the separation chamber. The exterior helical pitch edge of the helical vane is adaptively sized and secured to the interior wall of the separator chamber. The interior edge of the spiraling vane is expanding toward the center line of the separator chamber, or contracting from the center line of the chamber, as the vanes progress along the center line. Thus the free volume of the separator projected diametrically along the center line of the separator can increase in diameter or decrease in diameter, as the spiraling vane diverges or converges respectively. The pitch of the vanes can be varied in amplitude as is necessary. The helical vanes of flights may have a cut-out aperture in each vane of revolution adjacent the separator pipe chamber. The cut-out aperture in the second and succeeding vane facilitates the formation of a highest density fluid tubular stream along the wall of the separator device. The highest density, particulate type flow, collects as a laminar stream against the inner wall of the pipe separator chamber as it flows downstream in the chamber. Thus, three phase separation, at least, can occur in the fluid being processed in the separator device. An outer particulate, high density phase moves as a somewhat laminar flow against the pipe chamber wall in a downstream flow through the chamber. A low density phase can collect centrally in the fluid, due to the centrifugal effect.

A third phase of generally water is formed in the free volume between the high density and low density phase, which are separated by the centrifuging vanes and the cut-out apertures.

After the centrifugal separation of the phases of fluid, a coaxially centrally disposed and adaptively sized hollow diameter probe pipe means is secured and disposed in the free volume of the separation chamber downstream of the flight of vanes, to collect and dispose of the low density fluid as it is pumped downstream. The outer particulate, high density phase, moving as a somewhat laminar flow against the chamber wall, flows into the annular collector collar disposed annularly against the chamber interior wall and directed exteriorly from the chamber interior wall coplanarly around the chamber interior just downstream of the termination of the vane flight. Thus the high density phase and the low density phase of the inducted fluid are separated and collected separately from the mainstream fluid at a coplanar location in the separation chamber just downstream of the helical centrifugal vane termination plane in the separator.

The diameter of the inlet pipe and the coaxial separation chamber are co-adaptively sized to provide adjustment for the inlet three phase fluid flow into the inlet pipe and the rotating swirl of the inlet fluid, as it impacts on the first vane and begins its centrifugal rotating journey around the downstream vanes into three phase fluid separation at the terminal output of the separator.

The inlet pipe and pipe separator chamber must be proportioned to accommodate the three phase operation for a given process. The processes can range from removing the waste solids and cutting oils in a small machine shop operation to removing crude oil and earth mud from a crude oil drilling and recovery system. Thus the inlet pipe can be 2–3 inches in diameter, up to 3–4 feet in diameter for crude oil field collection system.

The tubular cut-out apertures in the second and succeeding helical vanes are adaptively sized to provide for the unimpeded collection of the highest density fluid phase in the central coaxial length of the multiple vanes, as the centrifugal forces operate.

Included in the objects of this invention are:

To provide for the centrifugal separation of phases simply of a multi-phase fluid.

To provide a pipe separation device for a multi-phase fluid, utilizing centrifugal means.

To provide a linear separator device for a three-phase fluid, utilizing a selected prime mover pump for maintaining the flow of the input three-phase fluid through the pipe separator device.

To provide a coaxial separator device which separates a three-phase fluid into separate mud solid phase, low density oil phase, and a water phase (or the like).

To provide a coaxial input pipe and separator chamber device which can be proportioned in pipe and chamber diameters for up to 48 inch diameter, or larger, as required by the processing flow requirements of the separation process.

Other objects and advantages of this invention are taught in the following description and claims.

BRIEF DESCRIPTION OF THE DRAWINGS

The description of this invention is to be read in conjunction with the following drawings:

FIG. 1 is a cross sectional view of the static in-line coaxial centrifugal separator device having an input fluid flow pipe coaxially disposed and directly connected to a co-linear tubular separator chamber. The separator chamber has multiple helical spiraling vanes disposed and secured to the interior chamber wall, providing a centrifugal motion to the multi-phase input flow into the chamber. A centrally disposed probe means is coaxial with the helical vane and provides for the collection of a low density output phase. A high density particulate fluid phase collects as a laminar flow on the interior of the chamber wall, and is collected as a product.

FIG. 2 is a cross sectional view through 2—2 of FIG. 1, illustrating the first vane structure.

FIG. 3 is a cross sectional view through 3—3 of FIG. 1, illustrating the view of helical vane which is equivalent to the structure of FIG. 2.

FIG. 4 is a cross sectional view through 4—4 of FIG. 1, in which the spiraling vane is shown in an expanding diametrical mode, decreasing the free volume of the fluid stream axial flow.

FIG. 4A is a cross sectional view of an alternate modification of the spiraling vanes in a contracting diametrical mode, increasing the free volume of the fluid stream axial flow.

DESCRIPTION OF THE PREFERRED EMBODIMENT OF THE INVENTION

Referring to FIG. 1 in detail, 10 is a coaxial centrifugal separator which has a linear circular pipe exterior pipe 11 being disposed and secured to a set of two flanges 12. The full inflow of fluid stream 14 is multiphase, and can be introduced by gravity source (not shown), a gear pump (not shown), a diaphragm pump (not shown), or the like pump, which does not substantially increase the turbulence in the inlet fluid stream 14. The multiphase fluid inlet stream 14 can typically be a three phase fluid comprising a major quantity of water 15, in volume, a minor volume of oil phase 16 in volume, and a solid phase 17, which can be solid—mud or a particulate phase such as short cloth filaments or the like. The circular pipe 11 has a center line 19.

Just downstream of the two joined flanges 12, the spiraling helical vane 21 begins and is disposed inside and attached adjacently to the interior wall 20 of the pipe 11. The exterior helical pitch edge 22 of the helical vane 21 is adaptively sized and secured to the interior pipe wall 20. The continuous helical vane 21 is secured, as by bolts, angle irons and the like (but not shown in detail), to the interior wall 20 of pipe 11.

In a typical spiraling vane 21 construction, the vane 21 has a constant width 23 extending in length 24 of the separator 10. The constant width 23 is illustrated in FIG. 2, and FIG. 3, generating a free volume 25 inside the inner edge 26 of the spiraling vane 21. The free volume includes the volume inside the spiraling vane 21 which is not encompassed by the helical vanes 21, but which is inside the interior inner spiraling edge 26 of vane 21. As in FIG. 4, the interior inner spiraling edge 26 of the spiraling vane 21 can progressively expand toward the center line 19 of the pipe 11, as the spiraling vane 21 progresses from A to B. Alternatively, the inner spiraling edge 26 of the spiraling vane 21 can contract in width (see FIG. 4A) as it progresses from A to B. Thus the free volume 25 inside of the separator vane 21 can be constant in diameter from A to B or the free volume 25 can contract in diameter from A to B, or the free volume 25 inside the vane 21 can expand in diameter from A to B.

The spiraling helical vane 21 disposed and secured to the linear pipe 11 interior operates to provide a centrifugal rotary motion to the entering inflow stream of multiphase fluid 14.

As the fluid 14 progresses downstream of the separator 10 from A to B, the multiphase fluid 14 is separated into the three phases. The low density oil type phase 16 collects along the center line 19 of separator 10, according to Stoke equation (1). The major water phase of medium density 15 passes through free volume 25, and exits the separator 10 at reference line 27. The mud or particulate phase 17, of highest density, collects in a somewhat laminar phase near to and adjacent the exterior helical vane edge 22 as the fluid stream 14 moves down the separator, from A to B, aided by the multiple apertures 28 at the edge 22 in the spiraling vane 21. The length between A and B is the value necessary to complete the separation of the multiphase fluid 14, with the aid of the spiraling vane 21. The interior diameter 29 of the pipe 11 is the value necessary to accommodate the stream of multi-phase fluid flow 14 as it is moved in centrifugal flow from A to B.

At point B there is disposed across the planar diameter 29 of pipe 11, a pipe probe means 30 which has a diameter 31 adaptively sized and secured through the pipe means 30 extension 32 through the wall 20 of pipe 11. The valve 33 regulates the oil phase 16 flow to a tank (not shown). The diameter 13 is adaptively sized to accept all of the oil phase 16 as is separated by the centrifugal flow. The pipe probe means 30 is disposed centrally on the center line 19 of the separator.

Point B is concurrently disposed and adaptively sized so the solid phase 17 collector collar 34, extends along the interior wall 20 of pipe 11. A dump collar 36 encircles the pipe 11 and receives the solid phase 17. The dump collar 36 has a pipe discharge 37 and a valve 38. The mud phase flow 17 is received in a container as required.

The major volume of water phase 15 typically flows out of outlet 39 of the separator 10 to a disposal means.

The size of the separator 10 can typically range from a pipe 11 diameter of 2.0 inches to 48 inches or more. The collector 10 size of 2 inch diameter can be used to separate metal turnings and lubricating oil from water in a small machine shop operation. The 48 inch diameter separator can be used to separate oil well mud and crude oil from the water in a typical crude oil recovery system for an oil well. Intermediate size separators can be used in commercial laundries to separate the effluent liquid of a laundry wash into liquid soap and oil phase, water phase, and particulate dirt phase.

Many modifications in the coaxial centrifugal separator can be made in the light of my teachings. It is understood that within the scope of the claims, the invention can be practiced otherwise than as described.

I claim:

1. A coaxial centrifugal separator comprising in combination:

a linear circular exterior pipe having an interior wall, a selected pipe length, a center line the length of said pipe, a selected pipe diameter, and a pipe entrance, a continuous, spiraling helical vane adaptively sized in diameter and length to snugly dispose inside said exterior pipe, said vane having bolts and securing means to adhere said vane to said exterior pipe, said vane having a constant vane width extending the length of said vane, providing a free volume both concentrically disposed and interior to said spiraling helical vane, a pipe probe means of a selected interior pipe diameter having an entrance means juncture disposed centrally on the center line of said exterior pipe after the vane length and having a pipe extension secured through the wall of said exterior pipe to a tank with a valve means regulating the incoming pipe probe means effluent, and, a solid phase collector collar extending parallel along the interior wall of said exterior pipe beginning at the pipe probe entrance means juncture, said collector collar having a dump collar disposed on said exterior pipe secured thereto for receiving the solid phase collected by said collector collar, and a pipe discharge connected to said dump collar with a dump valve for disposing of said solid phase, said coaxial centrifugal separator receiving a multiphase liquid input which is centrifugally separated along said spiraling vane into an effluent low density oil phase along the center line of the separator, an effluent solid phase along the interior wall of said exterior pipe emptying into the collector collar, and an effluent water phase emptying out of the exterior pipe through said free volume.

2. In the separator unit set forth in claim 1, the further modification wherein, said continuous, spiraling, helical vane has multiple cut-out apertures selectively sized and disposed in said spiraling vanes adjacent said exterior pipe and in each vane revolution.

3. A coaxial centrifugal separator comprising in combination:

a linear circular exterior pipe having an interior wall, a selected pipe length, a center line the length of said pipe, a selected pipe diameter, and a pipe entrance, a continuous spiraling helical vane adaptively sized in diameter and length to snugly dispose inside said exterior pipe, said vane having bolts and securing means to adhere said vane to said exterior pipe, said vane having an expanding width extending the length of said vane from said exterior pipe entrance, providing a free volume both concentrically disposed and interior to said spiraling helical vane, a pipe probe means of a selected interior pipe diameter having an entrance means juncture, disposed centrally on the center line of said exterior pipe after the vane length and having a pipe extension secured through the wall of said exterior pipe to a tank with a valve means regulating the incoming pipe probe means effluent, and, a solid phase collector collar extending parallel along the interior wall of said exterior pipe beginning at the pipe probe entrance means juncture, said collector collar having a dump collar disposed on said exterior pipe secured thereto for receiving the solid phase collected by said collector collar, and a pipe discharge connected to said dump collar with a dump valve for disposing of said solid phase, said coaxial centrifugal separator receiving a multiphase liquid input which is centrifugally separated along said spiraling vane into an effluent low density oil phase along the center line of the separator, an effluent solid phase along the interior wall of said exterior pipe emptying into the collector collar, and an effluent water phase emptying out of the exterior pipe through said free volume.

4. In the separator unit set forth in claim 3, the further modification wherein, said continuous, spiraling helical vane has multiple cut-out apertures selectively sized and disposed in said spiraling vane adjacent said exterior pipe and each vane revolution.

5. A coaxial centrifugal separator comprising in combination:

a linear circular exterior pipe having an interior wall, a selected pipe length, a center line the length of said pipe, a selected pipe diameter, and a pipe entrance, a continuous, spiraling helical vane adaptively sized in diameter and length to snugly dispose inside said exterior pipe, said vane having bolts and securing means to adhere said vane to said exterior pipe, said vane having a contracting width extending the length of said vane from said exterior pipe entrance, providing a free volume both concentrically disposed and interior to said spiraling helical vane, a pipe probe means of a selected interior pipe diameter having an entrance means juncture disposed centrally on the center line of said exterior pipe after the vane length and having a pipe extension secured through the wall of said exterior pipe to a tank with a valve means regulating the incoming pipe probe means effluent, and, a solid phase collector collar extending parallel along the interior wall of said exterior pipe beginning at the pipe probe entrance means juncture, said collector collar having a dump collar disposed on said exterior pipe secured thereto for receiving the solid phase collected by said collector collar, and a pipe discharge connected to said dump collar with a dump valve for disposing of said solid phase, said coaxial centrifugal separator receiving a multiphase liquid input which is centrifugally separated along said spiraling vane into an effluent low density oil phase along the center line of the separator, an effluent solid phase along the interior wall of said exterior pipe emptying into the collector collar, and an effluent water phase emptying out of the exterior pipe through said free volume.

6. In the separator unit set forth in claim 5, the further modification wherein, said continuous, spiraling, helical vane has multiple cut-out apertures selectively sized and disposed in said spiraling vanes adjacent said exterior pipe and each vane revolution.

* * * * *